United States Patent [19]

Meche et al.

[11] Patent Number: 5,634,192
[45] Date of Patent: May 27, 1997

[54] MOBILE-ASSISTED HANDOFF TECHNIQUE

[75] Inventors: Paul S. Meche, Richardson; Donald V. Hanley, McKinney; Larry D. Chrisman, Plano; Michael J. McCarthy, Dallas, all of Tex.

[73] Assignee: Northern Telecom Limited, Montreal, Canada

[21] Appl. No.: 393,348

[22] Filed: Feb. 23, 1995

[51] Int. Cl.⁶ .................................................. H04Q 7/38
[52] U.S. Cl. ........................................ 455/33.2; 455/56.1
[58] Field of Search .................. 455/33.1, 33.2, 455/33.4, 54.1, 56.1, 67.1, 67.3; 379/59, 60

[56] References Cited

U.S. PATENT DOCUMENTS

| | | | |
|---|---|---|---|
| 5,175,867 | 12/1992 | Wejke et al. | 379/60 |
| 5,257,408 | 10/1993 | Olson et al. | 455/54.1 |
| 5,471,670 | 11/1995 | Hess et al. | 455/56.1 |
| 5,493,563 | 2/1996 | Rozanski et al. | 455/33.2 |

FOREIGN PATENT DOCUMENTS

| | | |
|---|---|---|
| WO93/08655 | 4/1993 | WIPO . |
| WO93/12623 | 6/1993 | WIPO . |
| 94/01974 | 1/1994 | WIPO ................... 455/33.2 |
| WO95/01706 | 1/1995 | WIPO . |

OTHER PUBLICATIONS

Grimlund, "Handoff Strategies In Microcellular Systems", Vehicular Technology Conference, May 19–22, 1991, pp. 505–510.

*Primary Examiner*—Reinhard J. Eisenzopf
*Assistant Examiner*—Nguyen Vo
*Attorney, Agent, or Firm*—Lee, Mann, Smith, McWilliams, Sweeney & Ohlson

[57] ABSTRACT

A mobile-assisted handoff technique for a cellular mobile communications system. A mobile makes measurements of adjacent base stations and reports the measurements to the serving base station. The measurements are adjusted to predict signal measurements that the adjacent base stations would make of the mobile. A full set of adjusted measurements, or a combined set of adjusted measurements and true measurements, made by those base stations with locate receivers, may be used in determining the best cell to hand-off the mobile to.

13 Claims, 2 Drawing Sheets

| Power Class | Maximum Mobile Power (MMP) |
|---|---|
| 1 | 0 |
| 2 | 1 |
| 3 | 2 |
| 4 | 2 |

*Figure 2*

|  | MMP=0 | MMP=1 | MMP=2 |
|---|---|---|---|
| VMAX=0 | 0 | 1 | 2 |
| VMAX=1 | 0 | 0 | 1 |
| VMAX=2 | 0 | 0 | 0 |
| VMAX>2 | 0 | 0 | 0 |

MOBILE-ASSISTED HANDOFF TECHNIQUE

This invention relates to handoff techniques for use in a mobile cellular communications system and in particular to a mobile-assisted handoff technique for such a system.

BACKGROUND OF THE INVENTION

A mobile unit roaming through a cellular communications system experiences a varying quality of communications as it moves nearer or further away from a serving base station. The process of 'handoff', where a mobile is handed off to an alternative base station that can better serve the mobile, can be divided into three stages: 'trigger', where it is decided that the quality of communications has changed enough to consider handoff; 'selection', where measurements of alternative base stations are made; and 'decision' where a decision is made to handoff a mobile from the presently serving base station to the best available alternative base station.

In early cellular systems, all stages of handoff were performed by base stations of the system. In particular, serving and possible alternative base stations measured the quality of communications with a mobile. This clearly places a burden on the network, a burden which increases as the number of mobiles that must be monitored increases. The progression to digital time-division multiple access (TDMA) cellular systems has further increased the monitoring burden of the network. With an analogue cellular system such as AMPS a base station must tune to the frequency that the mobile is transmitting on and make a measurement of communications quality—typically received signal strength (RSS). With a digital system such as TDMA the base station must similarly tune to the frequency that the mobile is transmitting on, but additionally must find, and achieve synchronisation with, the particular time-slot that the mobile is using, and then make a measurement of the communications quality typically RSS or Bit Error Rate (BER).

Mobile-assisted handoff techniques reduce the amount of monitoring network that the network must perform by using measurements made by the mobile to assess potential alternative base stations.

According to one conventional mobile-assisted handoff technique, when a mobile begins communication with a base station on a TDMA voice channel the mobile is directed to begin signal strength measurements of the current forward voice channel as well as the control channels of surrounding cells. The mobile averages a number of the most recent measurements and reports this average RSSI measurement to the serving base station every second. When the averaged RSSI of the forward voice channel drops below a certain threshold and the mobile reports that at least one of the control channels of an adjacent cell is at an acceptable RSSI, a handoff trigger is generated. A target cell is considered from the best candidates reported by the mobile. Each of the best candidate cells are then requested to make a measurement of communications quality from the mobile using their locate receiver. The base station offering the best measurement that also has an available voice channel is selected, and a handoff attempt is made to that base station. This offers the advantage that only a small set of base stations, those identified by the mobile as offering the best signal, need measure the mobile.

However, if any of the candidate base stations or the serving base station does not have a locate receiver then the raw signal strength measurements made by the mobile are used directly to determine the target cell for handoff.

There are a number of disadvantages with the technique just described. Firstly, even the limited use of digital locate receivers to measure mobiles places a significant monitoring demand on the base stations and the supporting signalling network. Secondly, if locate receivers are unavailable, or if it is decided not to use them, then mobile signal measurements of adjacent control channels are used. These measurements do not account for a number of important issues, particularly the differences between control and voice channel powers and the power that a base station is delivering at the moment that a measurement is made.

Accordingly, there is a need to reduce the amount of monitoring that a network must carry out at handoff and a need to make mobile measurements a more reliable basis on which to handoff a mobile.

There is a further problem in conventional mobile-assisted handoff systems that both the base station and the mobile may initiate the 'trigger' stage. The base station takes its own measurements of call quality and triggers handoffs in response to those measurements. In such circumstances, a handoff triggered by a base station on cell A may determine that cell B is the best for the mobile, while a handoff triggerd by a mobile in cell B may determine that cell A is the best. This can lead to a 'ping-pong' effect between the mobile and base station This unnecessarily increases the processing burden on the system and degrades the overall call quality.

It is an object of the present invention to provide an improved handoff technique that reduces or overcomes these drawbacks.

It is a further object of the invention to provide an improved mobile cellular communications system.

SUMMARY OF THE INVENTION

According to the present invention there is provided a method of estimating handoff of a mobile in a mobile cellular communications system, the system comprising a mobile communicating with a serving base station, there also being a plurality of adjacent base stations transmitting signals, wherein the method comprises the steps of:

measuring by the mobile signals received from the adjacent base stations to give mobile signal measurements;

reporting the mobile signal measurements to the serving base station;

adjusting the reported mobile signal measurements to predict measurements that the adjacent base stations would make of signals received from the mobile, to give predicted signal measurements and, comparing the predicted signal measurements so as to select a preferred adjacent base station for a possible handoff.

BRIEF DESCRIPTION OF THE DRAWINGS

The invention will be further described with reference to the accompanying drawings in which:

FIG. 2 is a table showing the relationship between a mobile's power class and the maximum mobile power level it can achieve; and, FIG. 3 is a table illustrating the calaculation of one of the variables used in the invention.

DESCRIPTION OF THE PREFERRED EMBODIMENTS

Figure 1:
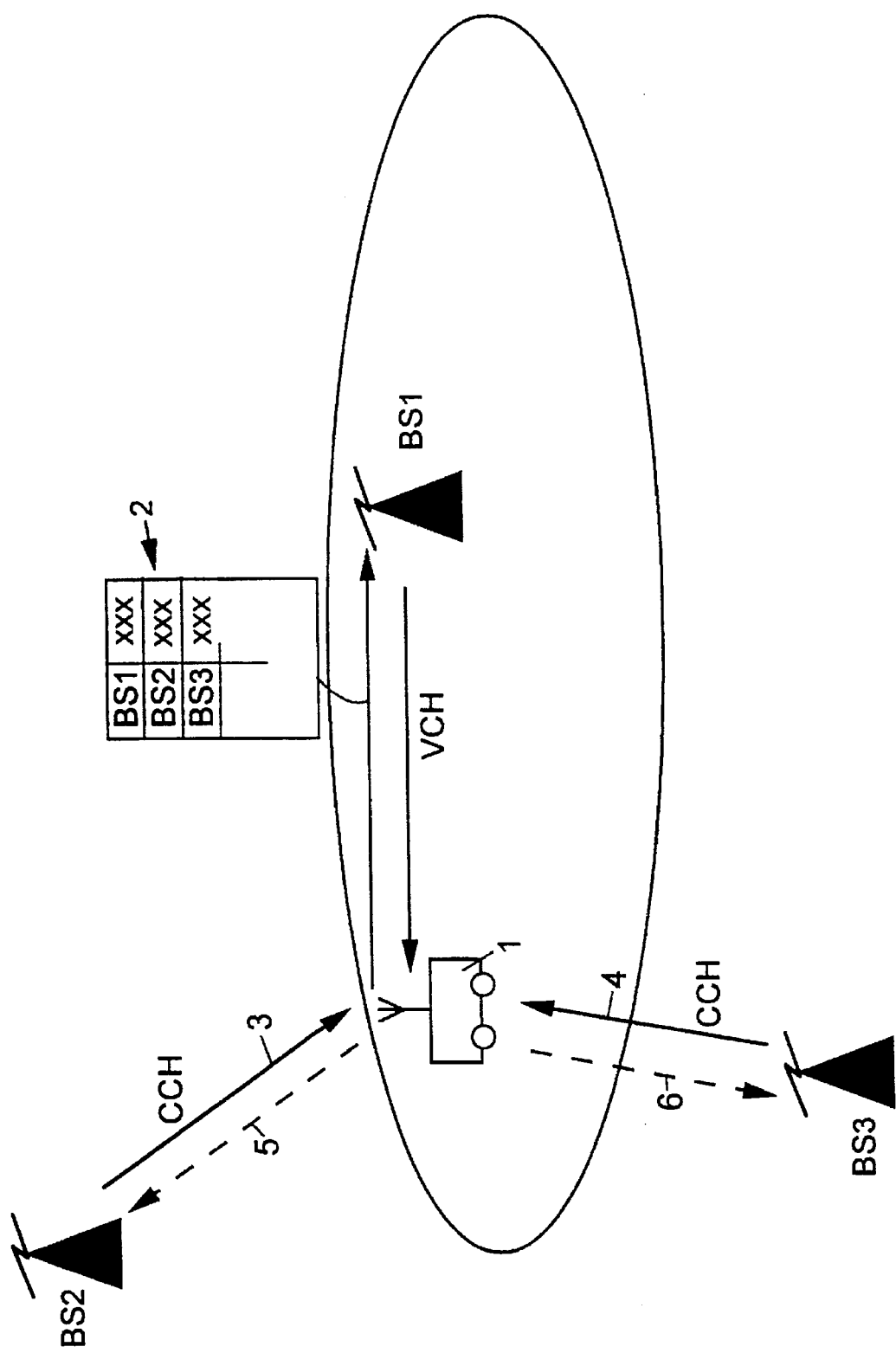
FIG. 1 shows, in schematic form, the concept of mobile-assisted hand-off in a cellular mobile communications system in accordance with the present invention.

With reference to FIG. 1, there is shown a mobile 1 receiving signals on a forward voice channel (VCH) from a serving base station BS1. Mobile 1 also receives signals on the control channels (CCH) 3,4 of adjacent base stations BS2, BS3 in neighbouring cells. Two adjacent base stations are shown as an example although there would usually be more. The mobile measures the quality of communications on the forward voice channel and the quality of the control channels of the adjacent base stations. In a TDMA system the mobile may monitor adjacent base stations by tuning to their channels during time-slots when it is not required to transmit or receive with the serving base station. A number of measurements are averaged to compensate for any irregular fluctuations caused for example by fading or momentary obstruction of the mobile. The mobile transmits these averaged measurements 2 to the serving base station BS1. So far this is the same as in a conventional mobile-assisted handoff method.

While the invention is described with reference to control channels, these may also be beacon channels, i.e. channels that are continuously transmitting solely to allow mobiles to make such measurements.

In accordance with one embodiment of the invention, the base station monitors the quality of the mobile to base station (uplink) path and initiates a hand-off trigger when the quality has changed enough to warrant it.

At the base station the signal quality measurements of adjacent base stations' control channels 3,4 made by the mobile are used to predict the level that an adjacent cell would receive from a mobile if it were on a voice channel on that cell. In effect, this predicts the level that a cell would receive if it were equipped with a locate receiver and made a measurement of the mobile's voice channel, and is equivalent to measurements of signals 5,6 in FIG. 1. Signal quality may conveniently be measured in terms of received signal strength, so that mobiles report a Received Signal Strength Indication (RSSI) which is typically expressed in dB or dBm, common units which allow calculation and comparison.

In converting the raw RSSI measurements of the mobile to predict the level that a target base station's voice channel would report as the mobile's RSSI, a number of factors must be considered. These include:

(a) power from base station into the downlink (b) downlink gain factors (c) tower heights (d) the difference of voice and control channel effective radiated powers (ERP)

(e) the difference between the voice channel talk-in and talk-out levels

Items, (a), (b), (c) and (d) all affect the total Effective Radiated Power (ERP) of the base station as seen by the mobile.

While the mobile measures the strength of an adjacent base station's control channel, it is the strength of a voice channel that is important since this is the main channel that a mobile will use when it is handed off. The difference in the ERP of the voice and control channels must therefore be considered, a factor which may vary from base station to base station. One particular case where the voice/control channel ERPs will vary considerably is where the cell is sectored, such that the base station has one omni-directional control channel and one directional voice channel per cell sector. Clearly, a mobile taking a measurement of just the omni-directional control channel will not be properly assessing a potentially valid sector to hand-off to.

The final factor, talk-in/talk-out, arises from the imbalance between the level of a mobile as received by a base station (talk-in) and the level of a base station as received by a mobile (talk-out) which normally results from differences in ERP, receive path gain between the base station and the mobile, the lack of diversity on the mobile, and other factors.

One preferred method of adjusting the mobile reported RSSI measurements to predict target cell receive levels is as follows [note that calculations assume proper conversions to common measures of power such as dBm (for absolute measurements) or dB (for relative measurements)]:

(i) Convert a mobile reported RSSI of a target cell's control channel to predict a mobile reported RSSI of a voice channel;

Predicted mobile RX of VCH=Mobile reported RSSI of CCH+ (VCHERP–CCHERP)

(ii) Predict the raw level of the mobile as received by the target cell on a voice channel by compensating for the talk-in/talk-out difference;

Predicted raw BS RX of VCH=Predicted mobile RX of VCH+ VCHTITO (iii) Adjust the predicted level of the mobile as received by the target cell on a voice channel by compensating for the maximum power level that the mobile can operate at:

Adjusted predicted BS=Predicted raw BS RX of VCH

RX of VCH–(PLDIFF*4)

where:

| | |
|---|---|
| VCHERP = | the effective radiated power of the voice channel of the target cell (in dBm) |
| CCHERP = | the effective radiated power of the control channel of the target cell (in dBm) |
| VCHTITO = | the difference in dB between the VCH talk-in and talk-out levels for a Class 1 mobile (talk-in - talk-out) |
| PLDIFF = | the difference between the mobile's maximum power level (MMP) and the maximum power level allowed in the target cell (VMAX), when the mobile is unable to reach VMAX. |
| = | the maximum of [0 or (MMP - VMAX)] |

The purpose of step (iii) is to compensate for the fact that a mobile may not be able to achieve the maximum power allowed in the target cell. Consequently, the predicted signal strength for the target cell must be reduced by the amount that the mobile falls below this maximum allowed power. This will be better understood after a brief explanation of mobile power levels.

Mobiles vary in the maximum RF power level that they can achieve; for example a hand-held mobile cannot achieve as high a RF power output as a vehicle-based unit. Mobiles have a power class rating which defines their maximum RF power output, such ratings ranging from 1 (for the most powerful) to 4 (for the least powerful). The power class rating of a mobile can be equated to a Maximum Mobile Power (MMP) that the mobile can achieve. The power level of a digital mobile can range from 0 to 10, but its maximum power output (MMP) ranges only from 0 to 2 as defined in FIG. 2. A change of one step in the MMP produces a 4 dB change in the mobile's RSSI.

Now, if the maximum power level allowed in a cell is less than the maximum power that a mobile can achieve (i.e. the value of VMAX is greater than MMP), then the mobile will be prevented from reaching its maximum power, and is often done to reduce interference in high density RF environments. Conversely, if the maximum power allowed in a cell is greater than the mobile's maximum power (i.e. the value of VMAX is less than MMP) then the mobile will not be able to achieve the maximum power level allowed in the cell. This is the situation that must be accounted for here since the parameters used in this method assume a class 1 mobile (i.e. the most powerful mobile) operating at the maximum power allowed in the cell (VMAX). The calculation of the adjusted measurement level multiplies the difference between VMAX and MMP by 4 to convert to dB.

FIG. 3 illustrates the calculation of the adjustment PLDIFF for a range of values of VMAX and MMP. Put simply, the adjustment value PDIFF is the value (MMP−VMAX) or zero, which ever is the greater.

Each set of parameters used above will differ for each base station. In order to adjust the measurements received from the mobile, a table of values corresponding to the adjustment parameters needs to be maintained. A table may be conveniently held at a base station, such that each base station holds a table of parameters corresponding to each of the neighbouring cells that a mobile might report measurements on. In the figure BS1 needs parameters for base stations BS2, BS3. Alternatively a central table may be maintained and accessed when parameters are needed. For the algorithm described above, the parameters needed are VCHERP, CCHERP, VCHTITO and VMAX.

In deciding which cell to hand off the mobile to, a complete set of adjusted mobile measurements may be used, with the mobile being handed-off to the best alternative base station with an available channel. In an alternative arrangement, a combined set of adjusted mobile measurements and locate receiver measurements are compared, such that base stations with locate receivers make measurements of the mobile, and those base stations without locate receivers have their corresponding mobile reported measurements adjusted according to the method of the invention.

For those base stations having a locate receiver, it is possible both to make a measurement of a mobile using the locate receiver and to predict a measurement by adjusting the mobile reported measurement. This has a number of benefits that are particularly important during the early stages of using the improved method; the accuracy of a prediction can be checked by comparing predicted and actual measurements and parameters can be adjusted to ensure that further predicted measurements are accurate.

We claim:

1. A method of estimating handoff of a mobile in a mobile cellular communications system, the system comprising a mobile communicating with a serving base station, there also being a plurality of adjacent base stations transmitting signals, wherein the method comprises the steps of:
   measuring by the mobile signals received from the adjacent base stations to give mobile signal measurements;
   reporting the mobile signal measurements to the serving base station;
   adjusting at least some of the reported mobile signal measurements to predict measurements that the adjacent base stations would make of signals received from the mobile, to give a set of predicted signal measurements and,
   comparing at least the set of predicted signal measurements so as to select a preferred adjacent base station for a possible handoff.

2. A method of estimating handoff as claimed in claim 1 wherein the step of measuring by the mobile signals received from the adjacent base stations comprises measuring control channels received from the adjacent base stations.

3. A method of estimating handoff as claimed in claim 2 wherein the step of adjusting the reported mobile signal measurements includes a step of converting the reported mobile signal measurements of control channels received from the adjacent base stations to predict signal measurements of voice channels received from the adjacent base stations.

4. A method of estimating handoff as claimed in claim 3 wherein the step of converting the measurements of control channels received from the adjacent base stations to predict signal measurements of voice channels includes adding a factor to compensate for the difference in the effective radiated power (ERP) of the voice and control channels.

5. A method of estimating handoff as claimed in claim 3 wherein the step of adjusting the reported mobile signal measurements additionally includes a step of compensating for the talk-in/talk-out difference of a signal between the mobile and adjacent base stations.

6. A method of estimating handoff as claimed in claim 5 wherein the step of adjusting the reported mobile signal measurements further includes a step of compensating for the maximum power level that the mobile can operate at on the adjacent base stations.

7. A method of performing handoff of a mobile in a mobile cellular communications system, the system comprising a mobile communicating with a serving base station, there also being a plurality of adjacent base stations transmitting signals, wherein the method comprises the steps of:
   monitoring by the serving base station quality of communication with the mobile;
   measuring by the mobile signals received from the adjacent base stations to give mobile signal measurements;
   reporting the mobile signal measurements to the serving base station;
   adjusting at least some of the reported mobile signal measurements to predict signal measurements that the adjacent base stations would make of signals received from the mobile to give a set of predicted signal measurements;
   comparing, in response to the quality of communication with the mobile changing, at least the set of predicted signal measurements so as to select a preferred adjacent base station associated with the best signal measurement and,
   handing off the mobile to the preferred base station.

8. A method of performing handoff as claimed in claim 7 wherein on the quality of communication with the mobile changing, those adjacent base stations having locate receivers are requested to make actual signal measurements, and to report them.

9. A method of performing handoff as claimed in claim 8 wherein the step of comparing the signal measurements includes comparing a set comprising both the predicted signal measurements and the actual signal measurements reported by the adjacent base stations.

10. A method of performing handoff as claimed in claim 7 wherein the step of monitoring by the serving base station quality of communication with the mobile comprises the serving base station making signal measurements of the mobile and comparing the measurements with a threshold.

11. A mobile cellular communications system comprising a mobile communicating with a serving base station, there also being a plurality of adjacent base stations transmitting signals, wherein:

the mobile includes measuring means to measure signals received from the base stations and reporting means to report the signal measurements to the serving base station, and the network further includes:

computing means to predict, from the signal measurements reported by the mobiles, signal measurements that the adjacent base stations would make of signals received from the mobile to give a set of predicted signal measurements;

comparison means to compare at least the set of predicted signal measurements and to select a preferred base station associated with the best signal measurement.

12. A mobile cellular communications system as claimed in claim 11 wherein the network includes means to handoff the mobile to the preferred base station.

13. A mobile cellular communications system as claimed in claim 11 wherein some of the base stations are equipped with locate receivers to measure signals received from the mobiles.

* * * * *